Dec. 5, 1961   E. R. CLASSON   3,011,299
ROTARY GRASS TRIMMER
Filed Dec. 24, 1958
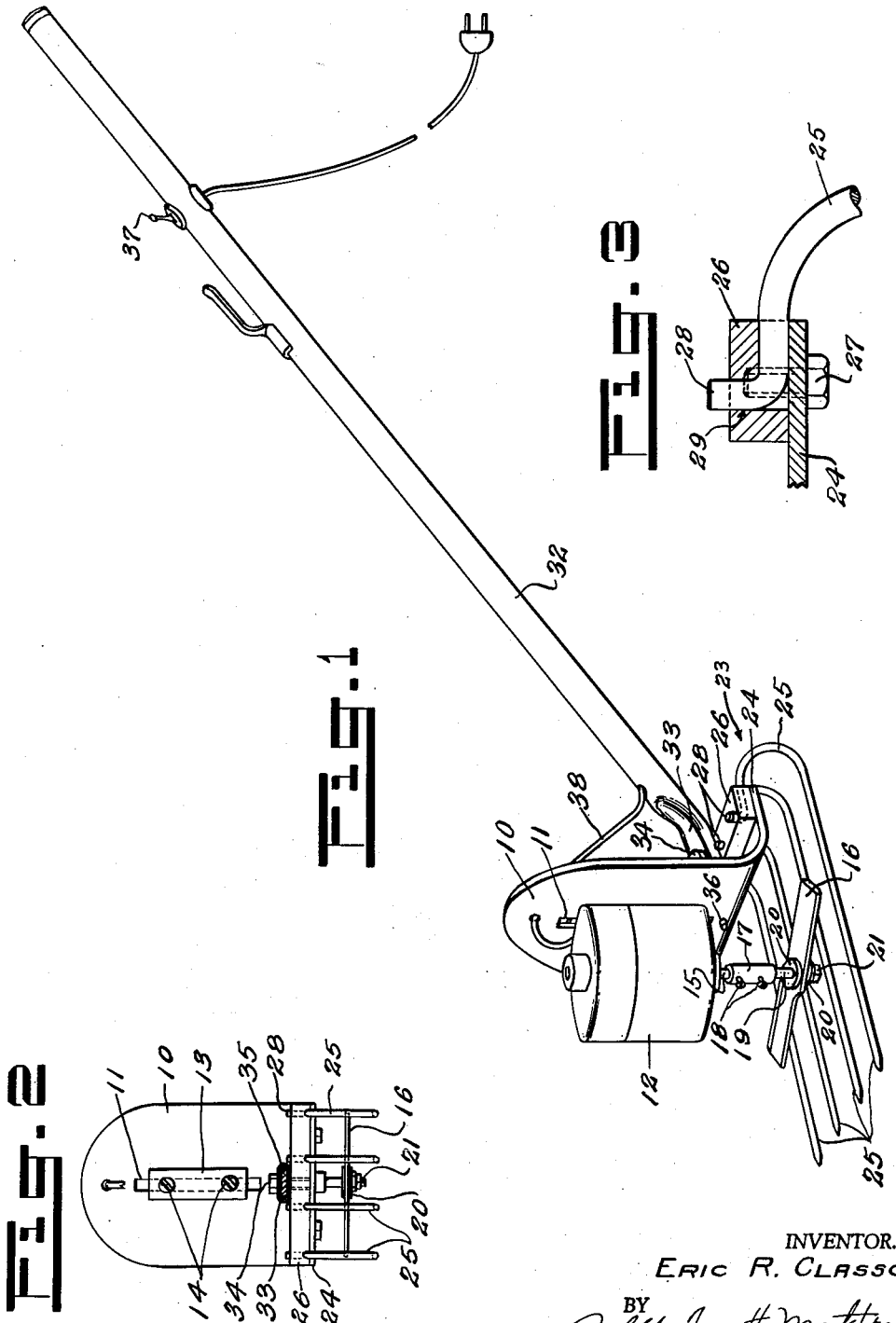
INVENTOR.
ERIC R. CLASSON
BY
Bohleber, Fassett & Montstream
ATTORNEYS

3,011,299
ROTARY GRASS TRIMMER
Eric R. Classon, 46—31 188th St., Flushing, N.Y.
Filed Dec. 24, 1958, Ser. No. 782,902
3 Claims. (Cl. 56—25.4)

The invention relates to a rotary blade trimmer driven by a motor such as an electric motor. It is desirable that such trimmers be inexpensive to manufacture and be able to approach closely to adjacent structure without danger of the cutting blade striking the same. Also should the blade strike an obstruction, the blade can yield.

It is an object of the invention to construct a trimmer which is inexpensive to manufacture and assemble and which performs an efficient trimming operation.

Another object is to construct a grass trimmer having a fork which slides easily along the ground. The edge tines on the fork can be projected between the grass and an adjacent wall, sidewalk and driveway edge to project the grass into the cutting blade and also raises the runners of crab grass to project them into the cutting blade of the trimmer.

Another object is to construct a grass trimmer having a cutter which can yield, if it should strike an obstruction.

Other objects of the invention will be more apparent from the following description when taken in connection with the accompanying drawings illustrating a preferred embodiment thereof in which:

FIG. 1 is a perspective view of the trimmer;
FIG. 2 is a rear view of the trimmer; and
FIG. 3 is an enlarged section of a fork tine attachment or anchorage.

The trimmer includes a motor mounting means or frame 10, such as a vertical plate having a slot 11 therein. A motor 12, such as an electric motor, is mounted in vertical shaft position on the mounting means in any suitable manner, that shown being by means of a backing plate 13 having screws 14 which pass through the plate and the slot 11 into the motor so that the motor may be adjusted vertically on the plate. This adjustment will adjust the elevation of the cutting blade above the ground or above the fork as will appear.

Cutter means is mounted on the motor shaft of the motor 12 including a circular cutter or blade 16. Any desirable attachment may be used that shown being a sleeve or coupling 17 having screws 18, one of which clamps the sleeve on the motor shaft 15 and the other clamps the cutter stem 19 to the sleeve. The cutter 16 is mounted on the stem 19. Preferably the cutter is mounted on the stem through friction means including washers 20, between which the cutter is mounted, and a nut 21 on the threaded end of the cutter stem 19. If, therefore, the blade should strike an object it will yield, however, the frictional resistance between the washers and the cutter will drive the cutter to cut grass and other vegetation. By using the sleeve or coupling 17, the cutter and its stem may be removed from the motor shaft without disturbing the adjustment of the friction means and the edges of the cutter sharpened.

The motor mounting means normally projects vertically and has a horizontal or rearwardly extending portion 24. A fork 23 is carried by the motor mounting means which may be individual tines 25 attached to the mounting means and particularly to the horizontal portion of the mounting means. Each of the separate tines particularly shown is a round rod having one end attached to the horizontal portion of the mounting plate by a clamping bar 26 which is secured to the portion 24 by means of bolts 27. The tines are positively prevented from pivoting such as by their ends 28 being bent laterally at an angle and shown as being bent upwardly and projecting through a vertical hole 29 in the clamping bar. The tines have an upper portion bent rearwardly away from the mounting plate and a portion extending downwardly for a half circle and then a portion extending horizontally forwardly to extend beyond the circular path of the cutter to provide ground runners. The forwardly extending portion of the tines which contact the ground are straight throughout their length to the forward terminating end. The ends of the blade may rotate underneath the upper portion and above the fork or tines. The cutter 16 may be any length or diameter, however, it is desirable that it have a dimension approximating the spacing of the outer edge tines or runners 25 or a little less than this spacing so that the tines protect the blade against striking a wall, obstruction or the like. Also the trimmer may be tilted on the outer edge tines if that should be desirable for a closer cutting of the grass and still is protected by the fork. The elevation of the cutter above the runners of the fork determines the grass height.

A handle 32 is attached on the motor mounting means which is accomplished in the handle illustrated by having its end 33 flattened. A bolt 34 passes through the handle and into the mounting means and particularly the clamping bar 26. In order to assure a more rigid attachment a plug 35 may be inserted in the flattened end of the handle which plug carries a projection 36 projecting into a hole in the mounting plate. The handle may carry a switch 37 for the motor, the switch being connected to the motor through a wire 38.

In use the trimmer is pushed on the runners or tines. An edge tine may be pushed between a wall or the like and grass growing adjacent the wall which projects the grass into the path of the cutter. To assist this the forward or free end of the runner may be pointed or flat ended. Also the tines in moving over the ground will raise the runners of crab grass into the cutter. An edge tine may be used as a guide for the trimmer by running along the edge of a sidewalk, driveway and the like. With the forward ends of the runners or tines extending beyond the path of the cutter, the latter cannot be pushed into an obstruction of greater width than the tine spacing. It has been mentioned that the trimmer may be tilted on an edge or side tine without danger of the blade striking the ground or an obstruction.

This invention is presented to fill a need for improvements in a rotary grass trimmer. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A trimmer comprising a motor mounting means, a motor having a vertical shaft, cutter means connected with the shaft including a cutter, a fork secured to the mounting means having at least three tines laterally spaced from each other extending beneath and spaced from the cutter and forming runners contacting the ground with an edge runner on each side, the spacing between the edge runners approximating the diameter of the cutter, the runners being the sole support for the trimmer, the runners being straight throughout the length thereof which is in contact with the ground and terminating in forward ends extending at least to the forward path of the cutter, the terminating forward ends of the tines forming an unobstructed opening above the runners into the cutter whereby the tines will lift and direct low lying vegetation and vegetation close to walls into the cutter, and a handle secured to the mounting means.

2. A rotary blade trimmer as in claim 1 in which the cutter is a rotary blade and the tines have a portion extending rearwardly, then a portion extending downwardly and then a portion extending forwardly underneath the cutter, and forming the runners, the mounting means having a rearwardly extending portion, and the cutter projecting at least beneath the rearwardly extending portion of the mounting means.

3. A rotary blade trimmer as in claim 2 in which each tine is an individual part having terminating ends with one end secured to the mounting means, each tine being a round rod having a laterally extending end secured to the mounting means, and a clamp bar secured to the mounting means and receiving the ends of the tines and having a hole receiving the laterally extending end of the tine.

References Cited in the file of this patent

UNITED STATES PATENTS

| | | |
|---|---|---|
| 244,805 | Hall | July 26, 1881 |
| 1,099,150 | MacPhail | June 2, 1914 |
| 2,392,909 | Fogliasso | Jan. 15, 1946 |
| 2,480,944 | Malpass | Sept. 6, 1949 |
| 2,487,224 | Dreischerf | Nov. 8, 1949 |
| 2,539,779 | Grosso | Jan. 30, 1951 |
| 2,651,159 | Rountree | Sept. 8, 1953 |
| 2,724,229 | Graham | Nov. 22, 1955 |
| 2,934,882 | Kaut | May 3, 1960 |

FOREIGN PATENTS

| | | |
|---|---|---|
| 253,199 | Switzerland | Feb. 29, 1948 |